No. 673,014. Patented Apr. 30, 1901.
P. BROADBOOKS.
NIPPERS.
(Application filed June 11, 1900.)

(No Model.) 2 Sheets—Sheet 1.

Witnesses
H. B. Hallock.
J. J. Williamson.

Inventor
Peter Broadbooks
Atty.

No. 673,014. Patented Apr. 30, 1901.
P. BROADBOOKS.
NIPPERS.
(Application filed June 11, 1900.)
(No Model.) 2 Sheets—Sheet 2.
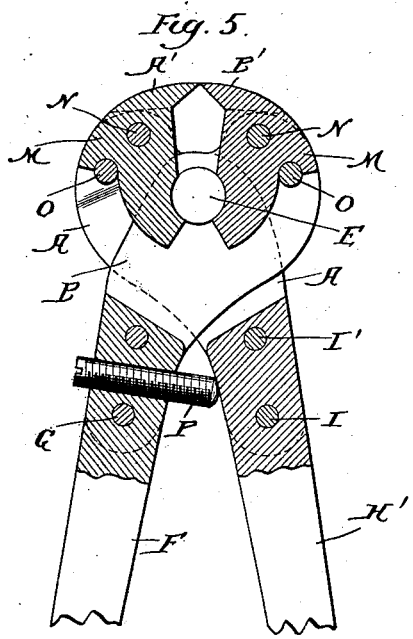
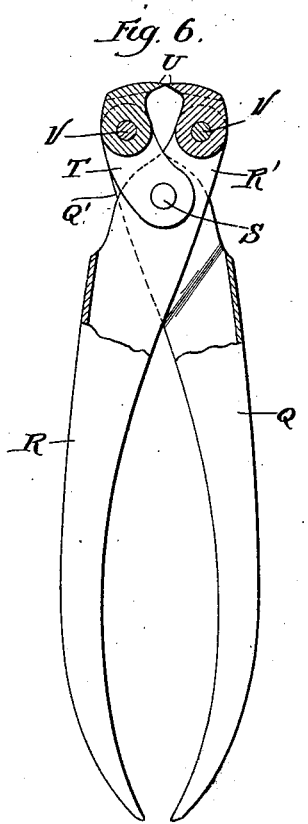
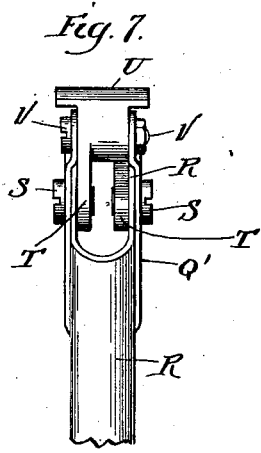
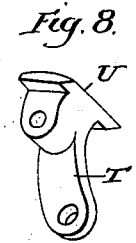
Witnesses
H. B. Hallock.
J. J. Williamson.
Inventor
Peter Broadbooks
by Geo. C. Hazelton
Atty.

UNITED STATES PATENT OFFICE.

PETER BROADBOOKS, OF BATAVIA, NEW YORK.

NIPPERS.

SPECIFICATION forming part of Letters Patent No. 673,014, dated April 30, 1901.

Application filed June 11, 1900. Serial No. 19,816. (No model.)

*To all whom it may concern:*

Be it known that I, PETER BROADBOOKS, a citizen of the United States, residing at Batavia, county of Genesee, and State of New York, have invented a certain new and useful Improvement in Nippers, of which the following is a specification.

My invention relates to a new and useful improvement in compound lever-cutting nippers, and has for one object to so construct nippers of this description as to render them exceedingly durable, rigid, and effective, while making them comparatively light; and a further object of my invention is to so construct and arrange the jaws as to facilitate their removal for sharpening or other purposes.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1:
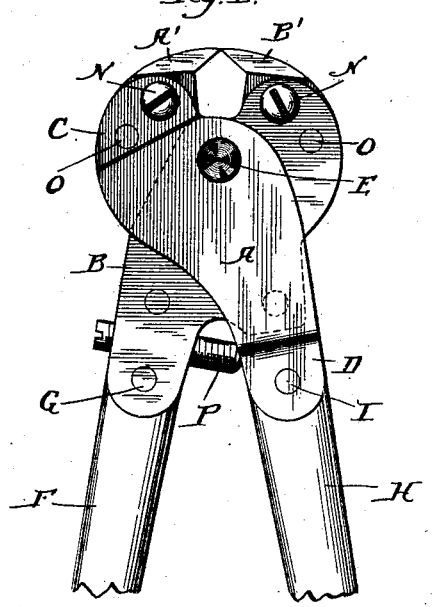
Figure 2:
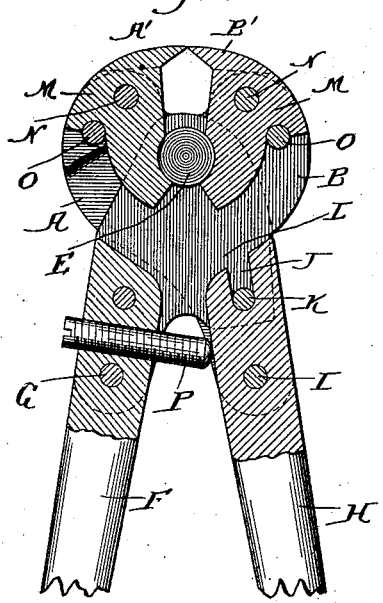
Figure 3:
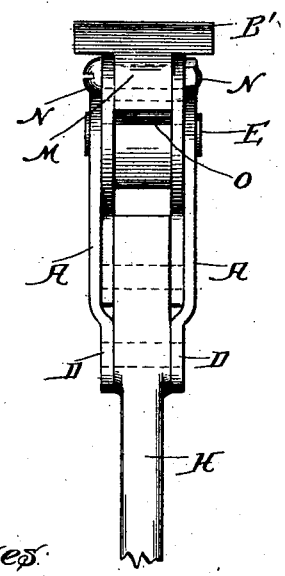
Figure 4:
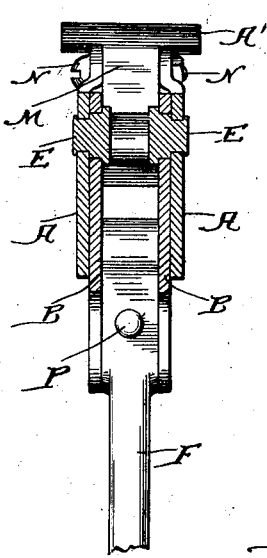

Figure 1 is a side view of a pair of nippers made in accordance with my improvement; Fig. 2, a section thereof, showing the interior construction; Fig. 3, an edge view illustrating the interlocking of the side plates; Fig. 4, a section also showing the interlocking of the side plates and the arrangement of the central pivot, which serves to connect these plates. Fig. 5 is a view similar to Fig. 2, showing my improvement adapted to a pair of nippers of the simple lever form. Fig. 6 is a section of a pair of nippers intended for light work, the handles of which are made of sheet metal; Fig. 7, an edge view of the upper portion of these nippers, and Fig. 8 a detail perspective of one of the jaws thereof.

In carrying out my invention as embodied in Figs. 1 to 4, inclusive, I form the head of the nippers by the use of two pairs of plates A and B, which may be made of sheet metal or forgings, the pair of plates A having offsets C and D formed thereon, so as to bring the front and rear extension thereof into alinement with the front and rear extension of the plate B for the purpose hereinafter set forth. The pairs of plates are pivoted together by the studs E, which have enlarged heads which abut against the inside of the plates B. The outer ends of these studs E are riveted outside of the plates A. The plates A are pivoted upon a portion of the studs E which is turned down smaller than the portion upon which the plates B are pivoted, so as to form the shoulder against which the inside of the plates A will abut for the purpose of preventing the plates A and B from being bound too tightly together when the studs E are riveted. As a matter of fact, the riveting of the studs E would cause the plates A and studs E to move in unison, and the plates B are pivoted upon the studs E; but this is not essential, as both the plates A and B could turn loosely upon the studs E. The stationary handle F is secured by rivet-pins G to the rear extensions of the plates B, so as to be rigid therewith, and this handle is preferably made of forging in order that relative to its weight it may be exceedingly strong. The handle H is made similar to the handle F and is pivoted by the rivet-pin I between the rear extension of the plates A, which on account of the offsets D fits snugly against this handle. The forward end of the handle H is slotted, as indicated at J, and this slot embraces the rivet-pin K, the latter being secured in the heels L of the plates B. Thus, as is obvious, a compound lever will be formed for the operation of the plates A, and the go and come incident to the movements of the lever H are provided for in the slot J.

The jaws A' and B' are secured in the forward extensions of the plates A and B, respectively, in the following manner: These jaws being provided with the shanks M, said shanks are fitted between the plates and the screw-bolts N passed through the plates and the shanks, while the rivet-pins O are secured in the plates and fit in notches formed in the shanks of the jaws, as clearly shown in Fig. 2, while the inner ends of the shanks fit around the heads of the studs E in such manner as to ride thereon after the manner of a fulcrum, and the heads of these studs are thus caused to take up a portion of the strain brought to bear upon the jaws when in operation. This arrangement permits the ready removal of either or both of the jaws by simply removing one or both of the screw-bolts N, as will be readily understood, and this is of considerable advantage, since the remainder of the nippers do not have to be disassembled, and the jaws may thereby be sharpened and replaced with but little loss of time or others may be substituted therefor when necessary.

In order that the cutting edges of the jaws which are adapted to meet may not be injured by coming in contact with each other with undue force, a gage-screw P is threaded through the handle F and adapted to limit the inward movement of the handle H. This screw may be adjusted from time to time, as necessity requires, to compensate for wear upon the cutting edges of the jaws by sharpening and the like. This construction makes an exceedingly rigid and durable pair of nippers for heavy work, and the compound leverage thereof permits the application of great power to the jaws while avoiding the use of complicated forgings or castings, thus minimizing the cost of the tool while increasing its efficiency.

In Fig. 5 I have embodied my improvement in simple lever-nippers in which the handle H' is secured directly to the plates A by the rivet-pins I', and, if desired, this handle may be forged with said plates; but I prefer that it be made in a separate piece, as greater strength for a given weight is thereby secured. The remainder of the tool is the same as that just described for light work.

My improvement may be embodied in the form shown in Figs. 6, 7, and 8, which consists of the handles Q and R, composed of sheet metal or light forgings and so formed as to terminate in the plates Q' and R', and these are pivoted together by the screws S, which also serve to hold the heel ends T of the jaws U in place, said jaws being also secured by the screw-bolts V. The heel of each of the jaws is formed upon one side of the shank thereof, so as to be secured by one of the screws and leave an open space through the nippers for the passage of wire and the like, and this is also true in connection with the constructions before described and is the improved feature in my improvement.

I prefer that the threads for the reception of the pivot-screws S be formed in the heels T, as these heels are of greater thickness than is necessary for the plates, and thus affords a better bearing for the screws. This form of nippers does not require a gage-screw, since it is for light work, and the handles being short do not permit of great pressure being brought to bear upon the jaws, and therefore the contact thereof does not injure the cutting edges.

Of course I do not wish to be limited to the exact details of construction here shown, as these might be slightly modified without departing from the spirit of my invention, the gist of which is to provide exceedingly strong, rigid, and effective nippers having an open space back of the jaws for the admission of work without the use of complicated or expensive castings or forgings.

Having thus fully described my invention, what I claim as new and useful is—

1. A pair of nippers formed of two pairs of plates, two studs pivoting said plates together, jaws secured between the forward ends of said plates, said jaws having heels bearing against the heads of the pivot-studs, a stationary handle rigidly secured to one pair of the plates, a compound lever-handle pivoted between the other pair of plates and fulcrumed to the first-named plates, and a gage-screw so arranged as to limit the movement of the jaws to prevent injury to their cutting edges, as specified.

2. In a pair of nippers, the combination of two pairs of plates so pivoted together as to leave an open space in the center thereof, a pair of jaws detachably secured between said plates, the heels of said jaws bearing against the pivots of said plates, handles carried by said plates, and a gage-screw for determining the forward movement of the jaws, as specified.

3. In combination with a pair of nippers of the character described, a pair of jaws, each member of which is secured between the plates of the nippers by a single screw, and heel ends bearing against the pivot-studs of the nippers, as specified.

4. In a pair of nippers, the combination of a pair of levers interlocking and pivoted together by two separate studs, two jaws, each of which is secured between the forward ends of the lever, said jaws having heels formed to one side thereof, each heel engaging one of the pivots of the lever, as specified.

In testimony whereof I have hereunto affixed my signature in the presence of two subscribing witnesses.

PETER BROADBOOKS.

Witnesses:
FRANCIS L. HAURS,
F. A. LEWIS.